United States Patent [19]
Henricksen

[11] Patent Number: 5,826,311
[45] Date of Patent: Oct. 27, 1998

[54] PLASTIC INJECTION MOLDED ADJUSTABLE ARM ASSEMBLY HAVING A MANUALLY RELEASABLE POSITIVE LOCKING MECHANISM

[76] Inventor: Douglas A. Henricksen, 938 99th Circle NE., Blaine, Minn. 55434

[21] Appl. No.: 735,457

[22] Filed: Oct. 23, 1996

[51] Int. Cl.⁶ .................................................. A44B 21/00
[52] U.S. Cl. .................. 24/518; 24/455; 24/517
[58] Field of Search .............................. 24/518, 517, 489, 24/455, 324; 248/311.2; 403/92, 93, 96

[56] References Cited

U.S. PATENT DOCUMENTS

| | | | |
|---|---|---|---|
| 2,956,542 | 10/1960 | Mueller | 24/517 |
| 4,828,211 | 5/1989 | McConnell et al. | 248/311.2 |
| 4,887,784 | 12/1989 | Kayali | 248/311.2 |
| 4,981,277 | 1/1991 | Elwell | 248/311.2 |
| 5,167,392 | 12/1992 | Henricksen | 248/311.2 |
| 5,305,502 | 4/1994 | Abrahams | 24/517 |

Primary Examiner—Victor N. Sakran

[57] ABSTRACT

A plastic injection molded adjustable arm assembly includes a base (102) having a detent wheel (104) that includes a plurality of detents (e.g., 106). An adjustable arm (202) includes a snap-in (204) for rotatably attaching the arm to the base. The arm also includes a locking mechanism (214) that includes a lever (218) that is attached to the arm at a fulcrum (216). A pawl (220) is located at one end of the lever (218a) to engage one of the detents in the detent wheel, thereby locking the arm in one of several angular positions. To release the lock and move the arm to a different position, the user pushes on the end of the lever opposite the pawl (218b), thereby causing the pawl to disengage from the detent. The base and the arm are each injection moldable using a single action mold. In one embodiment, the arm can be moved in one direction by the application of direct pressure to the arm, but it cannot be moved in the opposite direction until the locking lever is manually released. In a second embodiment, the arm cannot be moved in either direction until the locking lever is released manually.

4 Claims, 4 Drawing Sheets

5,826,311

PLASTIC INJECTION MOLDED ADJUSTABLE ARM ASSEMBLY HAVING A MANUALLY RELEASABLE POSITIVE LOCKING MECHANISM

BACKGROUND OF THE INVENTION

This invention pertains to plastic injection molded parts and, more particularly, to an adjustable arm assembly that can be used as a general purpose clamping mechanism and that has a positive locking feature that can be manually released.

Applicant requests that the U.S.P.T.O. permanently retain Disclosure Document No. 369426, which was filed circa Jan. 28, 1995 by the above named inventor. This Disclosure Document is incorporated by reference into this application.

In U.S. Pat. No. 5,167,392, a pivotally adjustable plastic injection molded arm assembly is disclosed in which a pawl at the free end of a cantilever spring engages one of a plurality of detents in a detent wheel, thereby providing a plurality of "click stop" positions. To move the arm from one position to another, the user simply applies sufficient force to the arm, thereby forcing the detent wheel and its attached arm to rotate until the pawl engages the next detent in the wheel. With this simple but effective mechanism, the arm can be moved in either direction by simply applying a small amount of force to the arm.

Other applications, however, demand an arm assembly that can be locked in one of several positions and not unlocked by simple pressure on the arm itself. Accordingly, one of the objects of the present invention is to provide an adjustable arm assembly that includes a mechanism that can lock the arm in one of several positions. If the arm can be locked in certain positions, it must also be easily released or unlocked. In one embodiment of the present invention, it is also an object of the invention to provide a locking mechanism for an arm assembly that permits the arm to move in one direction by simple application of force to the arm, but to hold the arm in a locked position when force is applied to the arm in the opposite direction. Manufacturability is also important and another object of the present invention is to provide a locking mechanism that can be injection molded using single action molding. Briefly, single action molding is the molding of parts using a simple mold with no cams or sliders to create undercuts in the part.

SUMMARY OF THE INVENTION

Briefly, the invention is an arm assembly that includes a base and a detent wheel connected to the base. The detent wheel has a plurality of detents. An arm is movably attached to said base and includes a locking mechanism that is integrally molded as part of said arm. The locking mechanism includes a lever and a fulcrum attaches the lever to the arm. The lever has a first portion that extends in one direction out from the fulcrum, and a second portion that extends in the opposite direction from the fulcrum. The free end of the first portion of the lever has a pawl for engaging one of the detents in the detent wheel to lock the arm in one of a plurality of positions. The application of force to the free end of the second portion of the lever causes the pawl to disengage from one of the detents, thereby unlocking the arm and permitting the arm to be moved to a new position.

BRIEF DESCRIPTION OF THE DRAWINGS

FIG. 13 is a detailed bottom plan view of the snap-in.

DESCRIPTION OF THE ILLUSTRATIVE EMBODIMENTS

Figure 1:
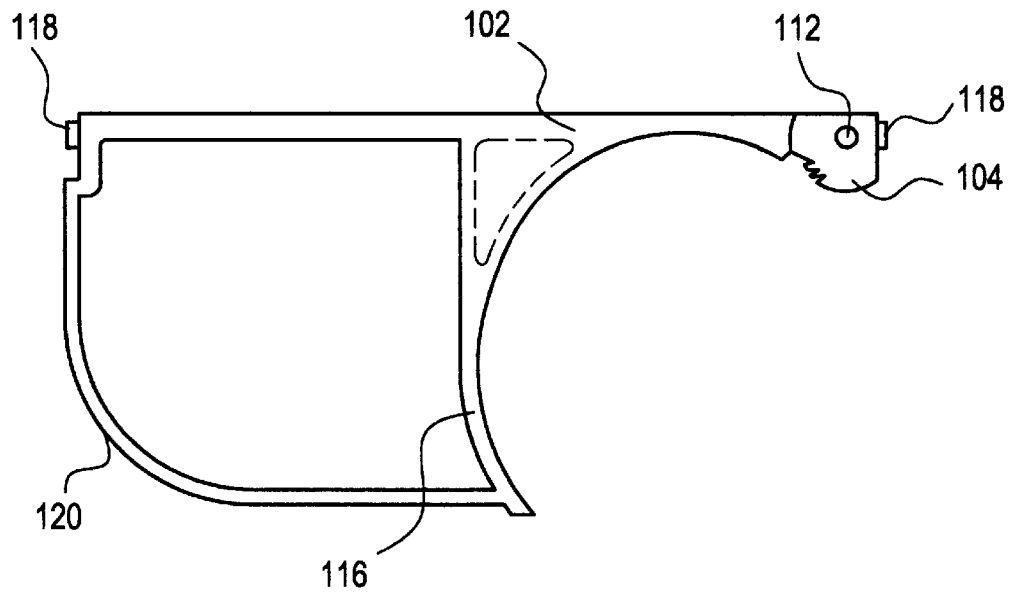
FIG. 1 is a top plan view of the detent wheel and base for the arm assembly of the present invention.
Figure 2:
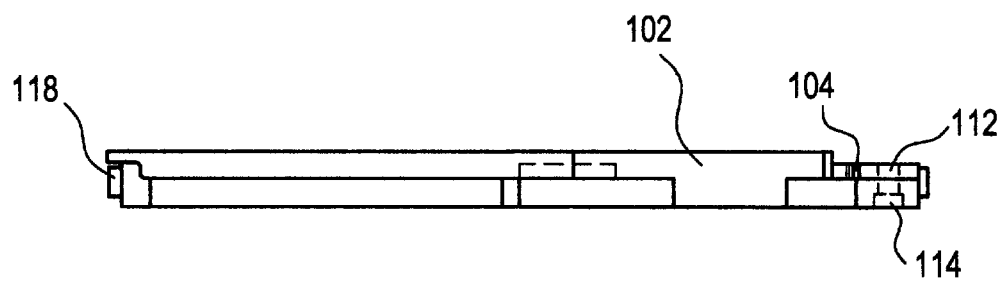
FIG. 2 is a front elevational view of the detent wheel and base.
Figure 3:
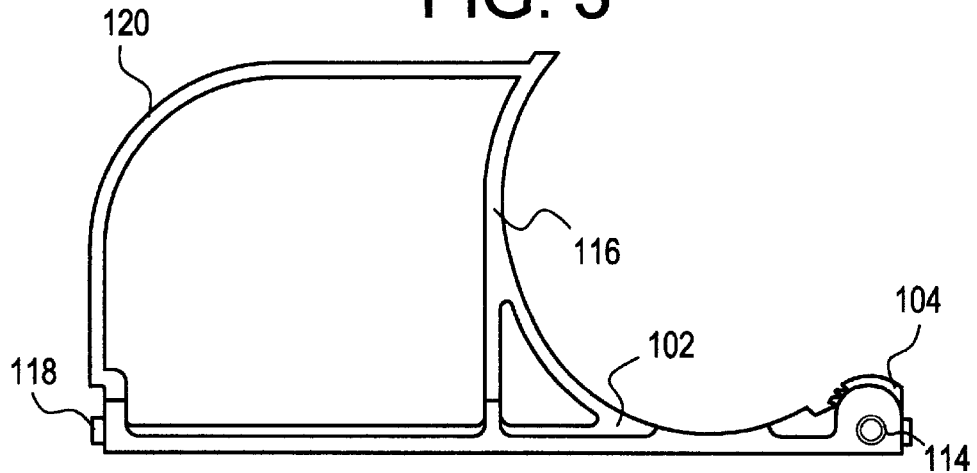
FIG. 3 is a bottom plan view of the detent wheel and base.
Figure 4:
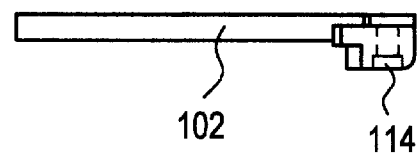
FIG. 4 is a right side elevational view of the detent wheel and base.
Figure 5:
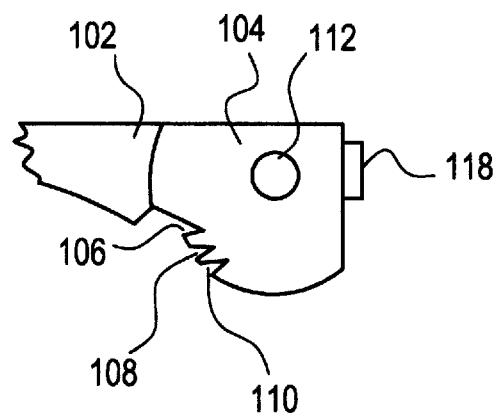
FIG. 5 is a detailed top plan view of the detent wheel.
Figure 6:
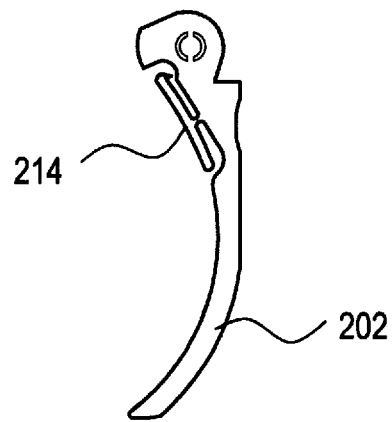
FIG. 6 is a top plan view of the arm and locking mechanism of the present invention.
Figure 7:
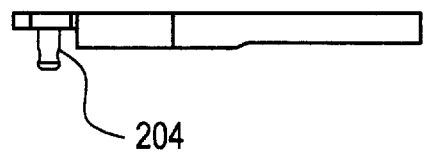
FIG. 7 is a left side elevational view of the arm.
Figure 8:
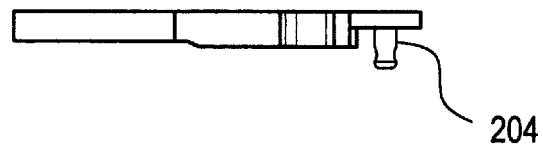
FIG. 8 is a right side elevational view of the arm and locking mechanism.
Figure 9:
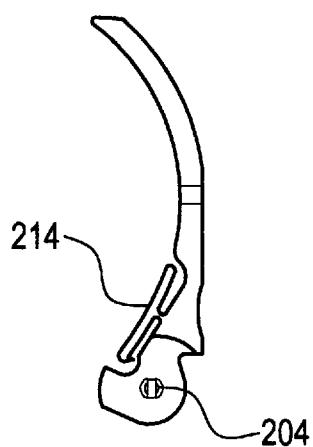
FIG. 9 is a bottom plan view of the arm and locking mechanism.

The supporting base 102 for the arm assembly is illustrated in FIGS. 1–5. Referring to these figures, the base 102 includes a detent wheel 104 that has a plurality of detents 106, 108 and 110. The base 102 includes a hole 112 located approximately in the center of the detent wheel portion of the base. A counter bore 114, which is best seen in FIGS. 2–4, is included on the underside of the base 102. The supporting base 102 also includes an opposing arm portion 116 and a bracket 120. Two hinge pins 118 are located at opposite ends of the base 102. The detent wheel 104, including the detents, hole and counter bore, the opposing arm 116, hinge pins 118 and the bracket 120 are all integrally molded as one part using a single action mold.

Figure 10:
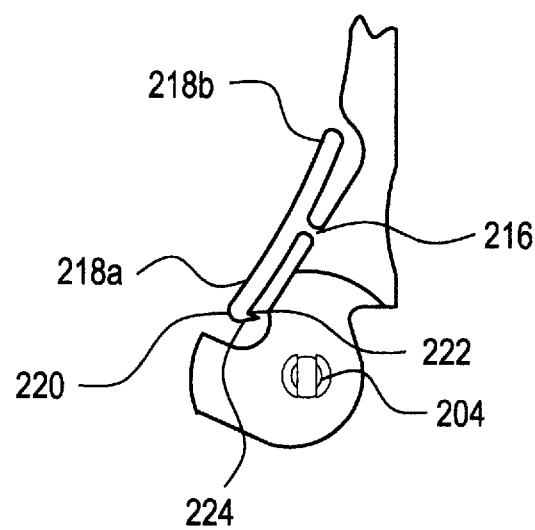
FIG. 10 is detailed bottom plan view of the locking mechanism.
Figure 11:
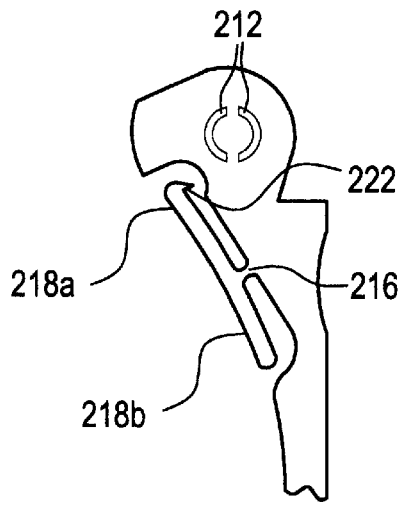
FIG. 11 is a detailed top plan view of the locking mechanism.
Figure 12:
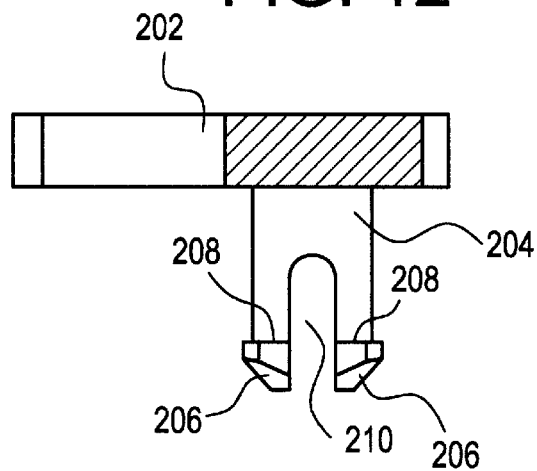
FIG. 12 is a detailed elevational view of the snap-in that rotatably attaches the arm to the supporting base.
Figure 13:
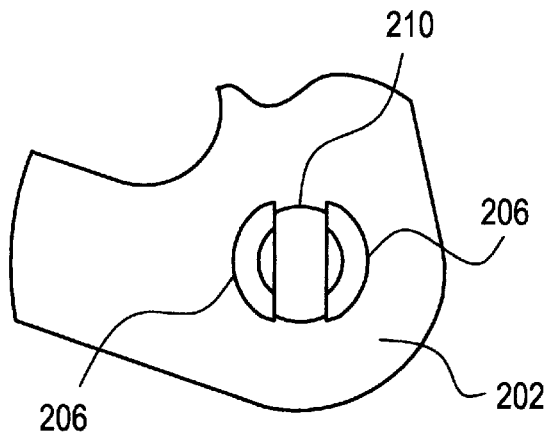

The adjustable arm is illustrated in FIGS. 6–13. Referring to these figures, the adjustable arm 202 includes a well known snap-in 204 to rotatably attach the arm to the supporting base 102. The snap-in 204, which is best illustrated in FIG. 12, includes an arrowhead shaped tip 206 that forms two flanges 208. The tip 206 is split into two portions by a slit 210 to permit the tip to be momentarily compressed during attachment to the base 102. Two arcuate shaped holes 212 (only illustrated in FIG. 11) are formed by two similarly shaped projections in the mold that come down through the top of the arm during molding and are responsible for forming the flanges 208 at the top of the tip 206, thereby permitting the snap-in to be molded using single action molding.

To attach the adjustable arm to the base 102, the tip 206 of the snap-in 204 is forcibly inserted into the hole 112, thereby compressing the two portions of the tip. Once the tip 206 has been forced completely through hole 112, the tip will be located in the counter bore 114, and the two tip portions snap back to their original position so that the flanges 208 prevent the arm from being pulled back out of the hole 112. Although the adjustable arm 202 is now attached to the base 102, it can still be moved by rotating it around the snap-in 204.

The arm also includes a locking mechanism 214, which is best illustrated in FIGS. 10–11. The locking mechanism includes a lever 218 that is attached to the arm 202 at a fulcrum 216. The lever includes two portions 218a and 218b that extend out in opposite directions from the fulcrum 216. The fulcrum is very narrow, approximately 0.020 inches thick, and its thickness should be selected according to the properties of the particular plastic being used to mold the arm assembly. A pawl 220 extends out from the free end of lever portion 218a. The arm 202, including the snap-in 204 and the locking mechanism 214, are all integrally molded as one part using single action molding. The preferred material for injection molding both the base 102 and the arm 202 is an extruded ABS plastic material, such as Dow 275 Natural.

When the arm is attached to the base 102, the pawl 220 engages one of the three detents 106, 108 or 110 to lock the arm in one of three angular positions. To release the locking mechanism 214 to permit the arm 202 to be repositioned, the user simply pushes lever portion 218b in (towards the arm), thereby forcing lever portion 218a out and disengaging the pawl from one of the detents. Since the fulcrum 216 and lever 218 are made from a resilient plastic material, the lever portion 218a springs back into its original position when the user releases the pressure on lever portion 218b and, if the pawl is lined up with one of the detents, locks the arm in position.

It should be noted that there are two fundamental embodiments of the invention. In a first embodiment, which is depicted in the drawings, the arm 202 is only locked in one direction. In other words, when the pawl 220 is engaged in one of the detents, the arm 202 can be moved inward (towards the opposing arm 116) by applying pressure directly to the arm, but the arm cannot be moved in the opposite direction (away from opposing arm 116) until the locking mechanism 214 is released by applying pressure to lever portion 218b. In a second embodiment, the arm cannot be moved in either direction by direct pressure to the arm 202, but can only be moved by applying pressure to lever portion 218b to release the locking mechanism.

The difference between these two embodiments is determined by the slope of the two walls in each detent 106, 108 and 110, and the slope of the two surfaces 222 and 224 of the pawl. In the first embodiment, as illustrated best in FIG. 5, the slope of the right-hand (counter-clockwise) wall of each detent 106, 108 and 110 is approximately perpendicular to the direction of arm rotation. Similarly, the slope of the interior (towards the fulcrum 216) surface 222 of pawl 220 is also substantially perpendicular to the direction of arm movement. These perpendicular walls and surfaces cause the pawl 220 to lock the arm 202 in position and to prevent arm movement in one direction. To the contrary, the slope of the lefthand (clockwise) wall of each detent 106, 108 and 110, and the slope of the exterior (away from the fulcrum 216) wall 224 of the pawl 220 are all sloped at an angle, such that pressure applied directly to the arm will force the pawl out of the detent and permit a change in arm position, but only in that one direction.

In the second embodiment, both walls of each detent 106, 108 and 110, and both surfaces 222 and 224 of the pawl 220 are formed substantially perpendicular to the direction of arm movement, thereby preventing the arm 202 from moving in either direction by the simple application of direct pressure to the arm. Instead, only pressure to the lever portion 218b can unlock the arm and permit it to be moved in either direction.

It should also be noted that it is possible to reverse the positions of the detent wheel 104 and the locking mechanism 214, such that the detent wheel is formed as part of the arm, and the locking mechanism is formed as part of the base, and such variation is within the scope of the claimed invention.

The particular application illustrated in the drawings is the use of the arm assembly of the present invention in a food and beverage holder. In particular, the arm assembly is used to hold a beverage container in place between the adjustable arm 202 and the opposing arm 116. The adjustability of the arm permits a wide variety of beverage container sizes to be firmly held in place.

Although the remainder of the structure for the food and beverage holder is not illustrated in the drawing figures, it is very similar to that depicted in FIG. 2 of U.S. Pat. No. 5,167, 392, in that it includes a frame 202, a foldable "base" 201, a pair of attaching hooks 225, an attaching strap 228, and a pair of brackets 211 each of which includes a hinge pin hole 212. The hinge pin holes 118 of the present invention mate with hinge pin holes in brackets similar to the ones illustrated in the '392 patent. This permits the base 102 of the present invention to be folded against a frame similar to the one illustrated in the '392 patent.

Although a food and beverage holder has been described, the present invention has many other applications in which an object is clamped between an adjustable arm, such as arm 202, and an opposing arm, such as opposing arm portion 116 of base 102.

Thus, although the shape of the arm 202 and the opposing arm 116 have been particularly adapted for holding beverage containers, the shape of these arms can be easily adapted to hold other objects.

I claim as my invention:

1. An arm assembly, comprising:

a base;

a detent wheel coupled to said base and having a plurality of detents;

an arm movably attached to said base; and a locking mechanism integrally molded as part of said arm, said locking mechanism including a lever and a resilient fulcrum attaching said lever to said arm, said lever having a first portion extending in one direction out from said fulcrum, and a second portion extending in the opposite direction from said fulcrum, the free end of said first portion of said lever having a pawl for engaging one of said detents in said detent wheel to lock the arm in one of a plurality of positions, wherein the application of force to the free end of said second portion of said lever causes said pawl to disengage from said one of said detents, thereby unlocking said arm and permitting said arm to be moved to a new position, and wherein said locking mechanism prevents both clockwise and counter-clockwise rotation of said arm when said pawl is engaged in one of said detents.

2. A beverage container receptacle, comprising:

a structure for supporting a beverage container;

a detent wheel coupled to said structure and having a plurality of detents;

a first arm coupled to said structure;

a second arm movably attached to said structure, said second arm opposing said first arm such that a beverage container can be held between said first and second arms; and a locking mechanism integrally molded as part of said second arm, said locking mechanism including a lever and a resilient fulcrum attaching said lever to said second arm, said lever having a first portion extending in one direction out from said fulcrum, and a second portion extending in the opposite direction from said fulcrum, the free end of said first portion of said lever having a pawl for engaging one of said detents in said detent wheel to lock said second arm in one of a plurality of positions, wherein the application of force to the free end of said second portion of said lever causes said pawl to disengage from said one of said detents, thereby unlocking said second arm and permitting said second arm to be moved to a new position.

3. The beverage container receptacle of claim 2, wherein said locking mechanism locks said second arm by preventing both clockwise and counter-clockwise rotation of said second arm when said pawl is engaged in one of said detents.

4. The beverage container receptacle of claim 2, wherein said locking mechanism locks said second arm only in one direction of rotation, but permits said second arm to be moved in the opposite direction of rotation.

* * * * *